March 7, 1961 W. TRIBLE 2,974,080
PROCESS OF CONSTRUCTION OF MACHINE TOOLS
Filed June 29, 1956 2 Sheets-Sheet 1

INVENTOR.
WINTHROP TRIBLE
BY
*H. N. Parsons & L. W. Wright*
ATTORNEYS.

March 7, 1961  W. TRIBLE  2,974,080
PROCESS OF CONSTRUCTION OF MACHINE TOOLS
Filed June 29, 1956  2 Sheets-Sheet 2
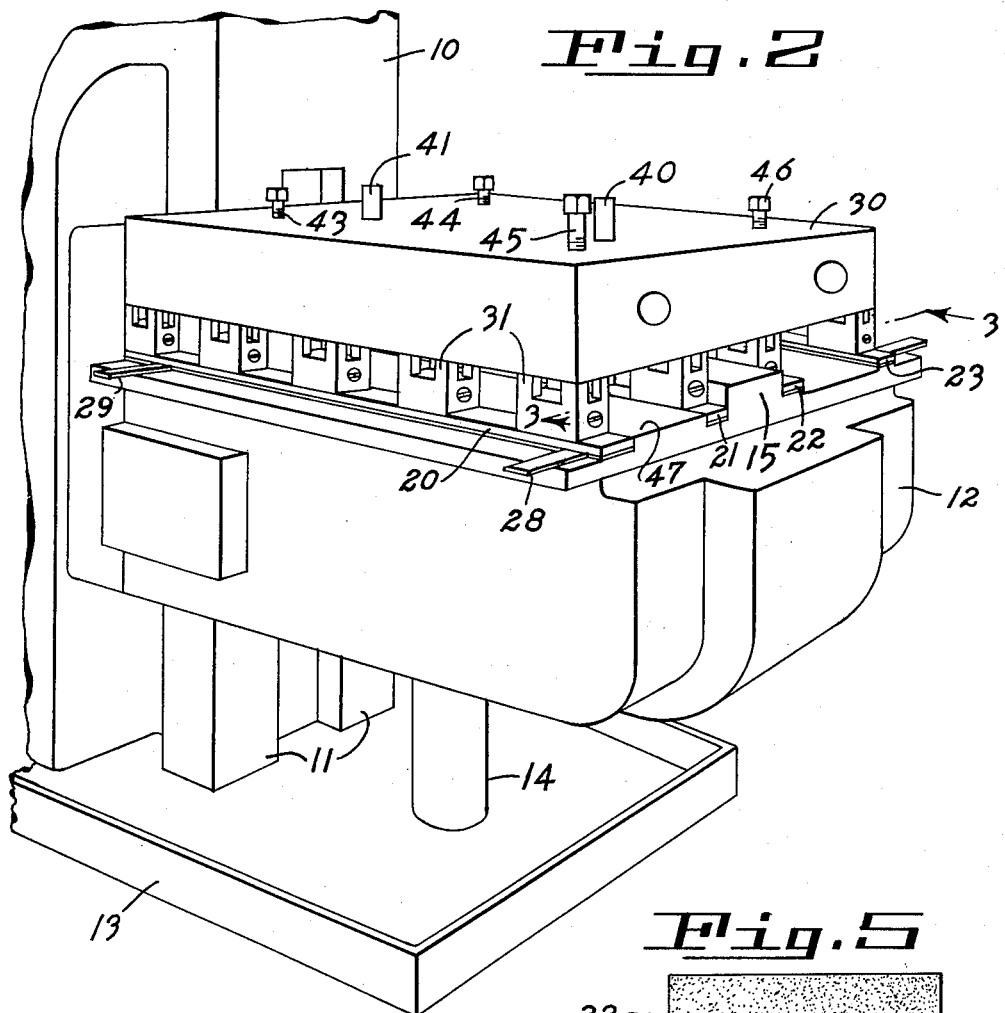
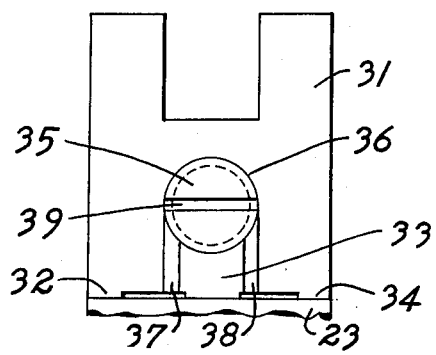
INVENTOR.
WINTHROP TRIBLE
ATTORNEYS.

United States Patent Office 2,974,080
Patented Mar. 7, 1961

2,974,080

PROCESS OF CONSTRUCTION OF MACHINE TOOLS

Winthrop Trible, Cincinnati, Ohio, assignor to The Cincinnati Milling Machine Co., Cincinnati, Ohio, a corporation of Ohio Filed June 29, 1956, Ser. No. 594,836

2 Claims. (Cl. 154—129)

This invention relates to an improved process for use in construction of machine tools such as milling machines and has particular reference to a novel and improved process for forming hardened ways on a milling machine element such as a knee.

One of the objects of the present invention is the provision of a novel and efficient process for securing preformed hardened way strips to the knee of a milling machine.

A further object of the invention is the provision of the process aforesaid which will facilitate the accurate aligned attachment of separately formed way strips to a machine tool unit such as a milling machine knee in such manner that a series of independent spaced ways will be provided on the knee in exact parallelism and proper height so as to eliminate the necessity of subsequent machining of the attached parts.

Another object of the invention is the proper preparation in connection with performance of the process aforesaid of an adhesive which as used will have the proper characteristics and consistency for adequate adherence to the unit and the way strip to be attached and, when set, will have sufficient cohesion strength and rigidity of body properly to maintain the way strips in position and support the weight of other elements of the milling machine designed for adjusting movement on the ways thereby provided.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 2 is a similar view showing the parts in initially closed relationship for determination of the position and relationship of the final attached elements.

Figure 4 is a view in elevation of one of the way strip retaining magnets carried by the jig.

Figure 5 is a fragmentary view of the underside of one of the way strips.

Figure 6 is a transverse section of one of the way strips on the line 6—6 of Figure 5.

Figure 1:
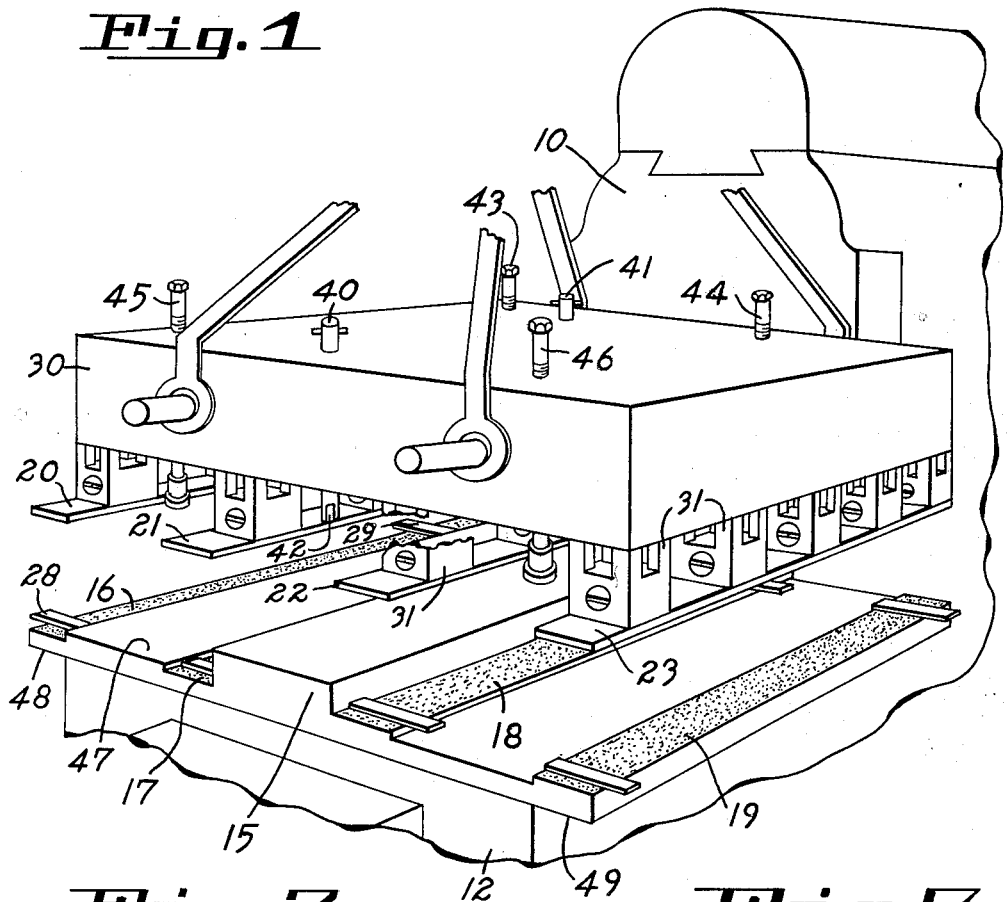
Figure 1 is a perspective view of a portion of a milling machine knee and the jig structure utilized in connection with the present process, the parts being in separated relation.

In the drawings the numeral 10 (Fig. 2) designates the column of a milling machine having ways 11 on which is vertically adjustable the knee unit 12. Carried by the base 13 of the machine is a knee adjusting screw 14 conventionally connected to the knee for supporting the weight of the knee and rotatable in any suitable conventional manner for raising or lowering the knee relative to the base 13 as guided by the ways 11.

It will be understood by those conversant with the art that a knee such as shown normally serves to support a transversely slidable saddle or work supporting member for movement toward and from the column as guided by the saddle guide tongue portion 15 of the knee.

Figures 3, 7:
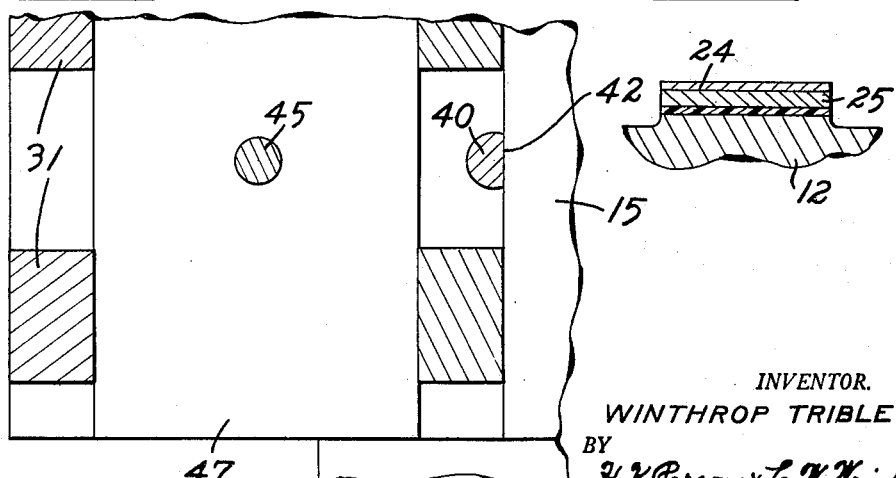
Figure 3 is a fragmetary transverse section taken as on the line 3—3 of Figure 2.
Figure 7 is a fragmentary transverse section of the knee and attached way strip.

To facilitate easy transverse adjusting movement of the saddle on the knee, such knee elements are normally provided at points such as 16, 17, 18, and 19 (Fig. 1) with integrally formed guiding days. Ordinarily, the knee unit is formed from a suitable cast iron. In accordance with the present invention, however, it is contemplted that the weight supporting guiding surfaces be formed from a harder material, and to this end there have been indicated as independently formed for attachment to the knee the hardened way strips 20, 21, 22 and 23. As indicated in Figures 6 and 7, these way strips are preferably individually formed with a wear strip 24 of suitable material as, for example, tool steel of 65-66 Rockwell C laminated to a mild steel backing and attaching portion 25. The parts of the laminated way strip, such as 23, having been united, they are then suitably ground or shaped so that the surfaces 26 and 27 will be in absolute parallelism throughout their extent and the surface 26 of the steel or other backing element sandblasted to provide a suitable mechanically cleaned and roughened surface, which, immediately prior to attachment to the knee, is preferably cleaned with carbon tetrachloride or like compound to dislodge and remove any residual abrasive sand as well as finger marks or other deleterious oily surface deposit.

Similarly, the way receiving surfaces at 16, 17, 18, and 19 on the knee are correspondingly sandblasted and cleaned.

In carrying out the present process shim elements, such as 28 and 29, are positioned on the ends of the respective way receiving surfaces of the knee, these shims preferably having a thickness not to exceed .005". With the shims in position, the way strips, such as 20, shown in Figure 2, are placed in position resting on the shims 28 and 29 and the work controlling jig 30 lowered to the position shown in Figure 2. As indicated, the fixture is provided with a number of magnets, such as 31, having parallel lower abutment portions as indicated at 32, 33 and 34 in Figure 4. While these may be of various types, it has been found desirable to utilize rotary "Alnico" cylindrical magnets 35 journaled in bores 36 in the members 31. These magnets are retained in position by the iron center bar 33 magnetically insulated from the portions 32 and 34 by the brazing or brass insert laminations 37 and 38. Each of the magnets is provided at its end with a suitable actuating portion such as the slot 39. It is a characteristic of this structure that when the slot is in a horizontal position as shown, the lines of magnetic flux will extend in a horizontal direction only, and there will be no magnetic effect as respects the portions 32, 33 and 34.

However, when the slot 39 is turned into a vertical position there will be a strong magnetic field between the member 33 and the members 32 and 34 completed by way of the underlying way strip such as 20 so that the magnets will securely hold and support the way strips against the members 31 but without creation of any heat effect such as might result from the employment of electro-magnetic devices.

To insure exact correct alignment of the jig with the knee structure, use is made of the sliding positioning pins, 40 and 41 having a flattened portion as at 42 for lateral engagement with the guide tongue 15 of the knee so that, as the jig is moved downward, these flattened surfaces may be held into engagement with the lateral face of the portion 15 insuring exact correct alignment of the elements.

With the parts in the position shown in Figure 2 the various magnets are set so that the way strips are supported from the jig by the magnets and the jack screws 43, 44, 45 and 46 which bear against intermediate finish surfaces such as 47 of the knee 12 are adjusted to support the entire assembly, including the way strips until the shims such as 27 and 28 are just free enough to be moved along the length of the way strips in the space between the strips and the underlying sandblasted faces 16, 17, 18, and 19 of the knee.

It will be understood that there may be slight bending intermediate the length of the ways due to inherent potential of one or more thousandths deflection of the knee in the area of the supporting screw 14. One of the advantages of the present process is that since the way strips are themselves held in definite position by the jig and attaching magnets that any variant on account of knee deflection will be absorbed in the way securing adhesive material so that the upper saddle supporting faces of the way strips will be in proper parallel relationship and at right angles to the guiding ways 11 for the knee on the face of the column 10.

When the way strips are thus secured by the magnets to the jig and the position of the jig determined by adjustment of the jack screws, the final correctness of positioning of the parts can be micrometer checked, using as a base the underside flanges such as 48 and 49 of the outside saddle gib ways and the jig determined ultimate position of the upper face of the strips 20, 21, 22 and 23.

When the various dimensions and relationship of the parts have thus been accurately determined, the jig and way strips are raised and the spacing shims removed.

In the carrying out of the process a proper way strip securing bonding cement is then prepared.

It has been discovered that a cement in accordance with the formula:

| | Grams |
|---|---|
| Epoxy resin, such as "828 Epon Resin" | 100 |
| Red oxide | 50 | with or without the addition of 15 grams of a resilient plasticizer, such as "Thiokol type LP-33" will provide a suitable basic cold epoxy cement. The foregoing ingredients are suitably mixed or commingled and provide a base which will have a viscosity in a range permitting its proper application to large surfaces such as here involved with sufficient inherent flexibility to minimize brittleness and produce in the finally utilized cement the characteristic of resisting crushing shocks that might otherwise fracture the bond line.

Preferably after the various described adjustments of the jig and the way strips have been completed there is added to the base mix a suitable catalyst such as diethylene triamine in proportion of 13 grams of said catalyst to 100 grams of the epoxy resin. For most satisfactory results these proportions should be fairly critically followed to insure that the potential life of the mix will be sufficiently long that the entire area of the surfaces of the knee and the way strip to be joined may be coated with the adhesive while at the proper utilizable consistency.

Application of the cement may be made by means of a brush, spatula, or otherwise, an excess amount over the intended ultimate thickness being applied to the surfaces to be joined.

In the carrying out of the process the surfaces having been coatd with the prepared adhesive or cement as indicated, the jig and way strips are lowered to their previous position, the pins 40 and 41 being held against the saddle guide tongue portion 15 of the knee to insure proper alignment of the parts, and the lowering of the jig being continued until the jack screws rest firmly upon the knee for support of the parts. During this lowering excess adhesive will be pressed out or displaced, leaving a layer intermediate the knee and way strips of the exact predetermined thickness. Attention is invited to the fact that preferably each magnetic head has at least an 80 pounds to 90 pounds holding power so that the surface tension of the bonding cement will not dislodge the hardened way strips as respects the supporting magnets upon initial contact of the adhesive coatings on the surfaces to be united. The parts having been moved to this closed position, it will be noted that while excess adhesive has been forced out or extruded, that during the setting process there is no residual actual pressure on the intermediate adhesive layer but that the parts are mechanically held in correct spaced relation. This positional condition is maintained for a suitable period which may be a number of hours until the adhesive has become thoroughly set or cured. After this, the magnets are deenergized and the jig removed. Subsequent check of machine tool knee with way strips applied and attached in accordance with our foregoing novel process has shown that any errors as to flatness or relationship of the parts were within a range of ±.00025" or of such accuracy that no subsequent scraping or other formation of the ways was required for proper assembly of the knee as a part of a complete machine.

From the foregoing it will be evident that there has been provided a new and novel process for formation of hardened ways on a machine tool structure such as a milling machine knee in which hardened way strips may be independently accurately machined to final form and thereafter applied and attached to the supporting unit therefor in extremely accurate relationship, eliminating necessity of subsequent machining operations while providing maximum accuracy, not only of the individual way surfaces but of the relationship of a plurality of surfaces which together jointly function for support of additional machine tool elements.

What is claimed is:

1. The process of forming a plurality of parallel ways on a machine tool unit by bonding hardened steel way strips in accurately aligned positions on the machine tool unit comprising the steps of magnetically holding the way strips with their working surfaces in accurately aligned positions with respect to one another, adjusting the way strips while thus held to predetermined accurately aligned positions with respect to the machine tool unit, said predetermined positions corresponding to the positions which the way strips are to occupy when finally fastened to the machine tool unit, removing the strips from the machine tool unit while continuing to hold them in said accurately aligned positions with respect to one another, interposing a layer of adhesive between the underside of each way strip and the area of the machine tool unit to be covered thereby, then returning the way strips while still magnetically holding them in said accurately aligned positions to said predetermined positions with respect to the tool unit to compress the adhesive between the way strips and the machine tool unit, and maintaining the way strips in said positions until the adhesive as set after which the strips are released from the influence of the magnetic bias whereby the way strips are securely and accurately fastened in place on the machine tool unit.

2. The process of forming a plurality of parallel ways on a milling machine knee having an elevating screw receiving boss by bonding hardened steel way strips in accurately aligned positions on the knee comprising the steps of roughening a receiving surface on the knee for each of the way strips, supporting the knee by the boss to normalize any inherent deflection of the knee, roughening one surface of each of the way strips to be secured to the knee, magnetically holding the way strips by their unroughened surfaces in accurately aligned positions with respect to one another, adjusting the way strips while thus held to predetermined accurately aligned positions with respect to the knee, said predetermined positions corresponding to the positions which the way strips are to occupy when finally fastened to the knee with sufficient space between the opposed roughened surfaces to provide the desired thickness of adhesive therebetween, removing the strips from the knee while continuing to hold them in their accurately aligned positions with respect to one another, applying a layer of adhesive to at least one of the roughened surfaces of each pair of opposed roughened surfaces, the thickness of each adhesive layer being somewhat greater than the spacing provided between the opposed roughened surfaces, then returning the way strips while still magnetically holding them in said accurately aligned positions to said predetermined positions with respect to the knee to compress the adhesive between the opposed roughened surfaces on the knee and on the way strips to the desired thickness, and maintaining the way strips in said positions until the adhesive has set after which the strips are released from the influence of the magnetic bias whereby the way strips are securely and accurately fastened in place on the knee.

References Cited in the file of this patent

UNITED STATES PATENTS

| | | |
|---|---|---|
| 2,071,647 | Miller | Feb. 23, 1937 |
| 2,545,370 | Mittelmann | Mar. 13, 1951 |
| 2,675,276 | Daugherty | Apr. 13, 1954 |
| 2,682,515 | Naps | June 29, 1954 |
| 2,800,811 | From | July 30, 1957 |

OTHER REFERENCES

"Alloying With Epoxies," by J. Charlton in "Modern Plastics," September 1954, pages 154–155, 157, 160 and 161.